United States Patent
Natarajan

(10) Patent No.: US 9,576,196 B1
(45) Date of Patent: Feb. 21, 2017

(54) LEVERAGING IMAGE CONTEXT FOR IMPROVED GLYPH CLASSIFICATION

(71) Applicant: Amazon Technologies, Inc., Reno, NV (US)

(72) Inventor: Pradeep Natarajan, Lexington, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 71 days.

(21) Appl. No.: 14/463,746

(22) Filed: Aug. 20, 2014

(51) Int. Cl.
| | |
|---|---|
| G06K 9/46 | (2006.01) |
| G06K 9/60 | (2006.01) |
| G06K 9/62 | (2006.01) |
| G06K 9/00 | (2006.01) |

(52) U.S. Cl.
CPC ......... G06K 9/00523 (2013.01); G06K 9/6217 (2013.01)

(58) Field of Classification Search
CPC .............................. G06K 9/4671; G06K 9/0014
See application file for complete search history.

(56) References Cited

U.S. PATENT DOCUMENTS

| | | | |
|---|---|---|---|
| 7,231,086 | B2 | 6/2007 | Abousleman et al. |
| 8,538,077 | B2 | 9/2013 | Zitnick, III |
| 2007/0058836 | A1 | 3/2007 | Boregowda et al. |
| 2010/0142830 | A1 | 6/2010 | Yahata |
| 2011/0135203 | A1 | 6/2011 | Iwamoto et al. |
| 2012/0307141 | A1 | 12/2012 | Millet et al. |
| 2013/0011055 | A1* | 1/2013 | You .................... G06K 9/00973 382/165 |
| 2013/0195376 | A1 | 8/2013 | Baheti et al. |
| 2014/0270344 | A1 | 9/2014 | Krishnamoorthi et al. |
| 2014/0320540 | A1 | 10/2014 | Deach |
| 2015/0016747 | A1 | 1/2015 | Huang |
| 2015/0161476 | A1 | 6/2015 | Kurz et al. |
| 2015/0178293 | A1 | 6/2015 | Chrysanthakopoulos |
| 2016/0026899 | A1* | 1/2016 | Wang ................... G06K 9/6261 382/176 |

OTHER PUBLICATIONS

Anna Bosh et al., "Image Classification using Random Forests and Ferns", IEEE Publication, 2007, 8 pages total.*
Natarajan, et al. Image Processing Using Multiple Aspect Ratio. U.S. Appl. No. 14/463,961, filed Aug. 20, 2014.

(Continued)

*Primary Examiner* — Brian P Werner
(74) *Attorney, Agent, or Firm* — Seyfarth Shaw LLP; Ilan N. Barzilay; Tyrus S. Cartwright

(57) ABSTRACT

A system to recognize text or symbols contained in a captured image using machine learning models leverages context information about the image to improve accuracy. Contextual information is determined for the entire image, or spatial regions of the images, and is provided to a machine learning model when a determination is made as to whether a region does or does not contain text or symbols. Associating features related to the larger context with features extracted from regions potentially containing text or symbolic content provides an incremental improvement of results obtained using machine learning techniques.

19 Claims, 13 Drawing Sheets

(56) References Cited

OTHER PUBLICATIONS

Bay, et al., Speeded-Up Robust Features (SURF). Computer Vision and Image Understanding (CVIU), vol. 110, No. 3: pp. 346-359, 2008.
Csurka, et al., Visual Categorization with Bags of Keypoints. ECCV International Workshop on Statistical Learning in Computer Vision, vol. 1, No. 1-22, Prague, 2004.
Dalal, et al., Histograms of Oriented Gradients for Human Detection. Computer Vision and Pattern Recognition, 2005. CVPR 2005. IEEE Computer Society Conference, vol. 1. IEEE, 2005.
Fogel, et al., Gabor Filters as Texture Discriminator. Biological Cybernetics, vol. 61, No. 2: pp. 103-113, 1989.
Forssen, et al., Shape Descriptors for Maximally Stable Extremal Regions. Computer Vision, 2007. ICCV 2007. IEEE 11th International Conference on, pp. 1-8. IEEE, 2007.
Gemert, et al., Kernel Codebooks for Scene Categorization. Computer Vision—ECCV 2008, Proceedings of the 10th European Conference on Computer Vision: Part III, pp. 696-709. Springer Berlin Heidelberg, 2008.
Jain, et al., Text Detection and Recognition in Natural Scenes and Consumer Videos. IEEE International Conference on Acoustic, Speech and Signal Processing (ICASSP), 2014.
Laptev, On Space-Time Interest Points. International Journal of Computer Vision, 64(2/3): pp. 107-123, 2005. Springer Science + Business Media, Inc.
Lowe, Object Recognition from Local Scale-Invariant Features. Computer Vision, 1999. Proceedings of the Seventh IEEE International Conference on vol. 2, pp. 1150-1157. IEEE, 1999.
Matas, et al., Robust Wide Baseline Stereo from Maximally Stable Extremal Regions. Image and Vision Computing 22, No. 10, British Machine Vision Computing 2002—Special Issue, pp. 761-767, 2004.
Nakajima, et al., Multiple Kernel Learning for Object Classification. Technical Report on Information Induction Sciences, 2009 (IBIS2009).
Neumann, et al., A Method for Text Localization and Recognition in Real-World Images. 10th Asian Conference on Computer Vision—ACCV 2010, pp. 770-783. Springer Berlin Heidelberg, 2011.
Ojala, et al., Performance Evaluation of Texture Measures with Classification Based on Kullback Discrimination of Distributions. Pattern Recognition, 1994. vol. 1—Conference A: Computer Vision Image Processing., Proceedings of the 12th IAPR International Conference on, vol. 1, pp. 582-585. IEEE, 1994.
Sanchez, et al., Image Classification with the Fisher Vector: Theory and Practice. International Journal of Computer Vision 105, No. 3 (2013).
Van De Sande, et al., Evaluating Color Descriptors for Object and Scene Recognition. Pattern Analysis and Machine Intelligence, IEEE Transactions on 32, No. 9 (2010): pp. 1582-1596.

* cited by examiner

LEVERAGING IMAGE CONTEXT FOR IMPROVED GLYPH CLASSIFICATION

BACKGROUND

Electronic devices may perform image processing on captured images to identify text, symbols and specific objects. The accuracy of such systems depends in part upon how much visual clutter is included in a captured image.

BRIEF DESCRIPTION OF DRAWINGS

For a more complete understanding of the present disclosure, reference is now made to the following description taken in conjunction with the accompanying drawings.

DETAILED DESCRIPTION

Various techniques exist for identifying text in an image. Many of these techniques can be abstracted into two steps: (1) identifying where text characters exist in an image and (2) interpreting the text characters so as to determine the text content. Early examples of both steps relied on brute-force computation to program a computer to look for specific defined patterns. Among the other downsides of such approaches are that such rigid programs are not very robust, as they have little capacity to recognize skewed or distorted text, text overlayed on complex backgrounds, and character fonts that depart from those included in the defined patterns.

More recent efforts have relied on machine learning, where an adaptive system is "trained" by repeatedly showing it positive and negative examples of text using an adaptive model until it can consistently identify text in an image even if the example is different from those included in the training images from which it learned. Getting an adaptive model to consistently identify a pattern is in part dependent upon providing the system with training data that represents features in an image in such a way that patterns emerge. But provided data with consistent patterns, recognizing such patterns when presented with new and different data is within the capacity of today's systems, and is in fact used by a wide variety of computer systems ranging from handheld personal consumer electronics to complex massively parallel supercomputers. Such efforts fall into the discipline often referred to as "machine learning," which is a sub-discipline of artificial intelligence (also known as machine intelligence).

In machine learning, support vector machines (SVMs) are supervised learning models with associated learning algorithms that analyze data and recognize patterns, such as the patterns in images, used for classification and regression analysis. Given a set of training examples, each marked as belonging to one of two categories, an SVM training algorithm builds a model that assigns new examples into one category or the other, making it a non-probabilistic binary linear classifier. An SVM model may be mapped so that the examples of the separate categories are divided by a clear gap. New examples are then mapped into that same space and predicted to belong to a category based on which side of the gap they fall on.

Figure 1:
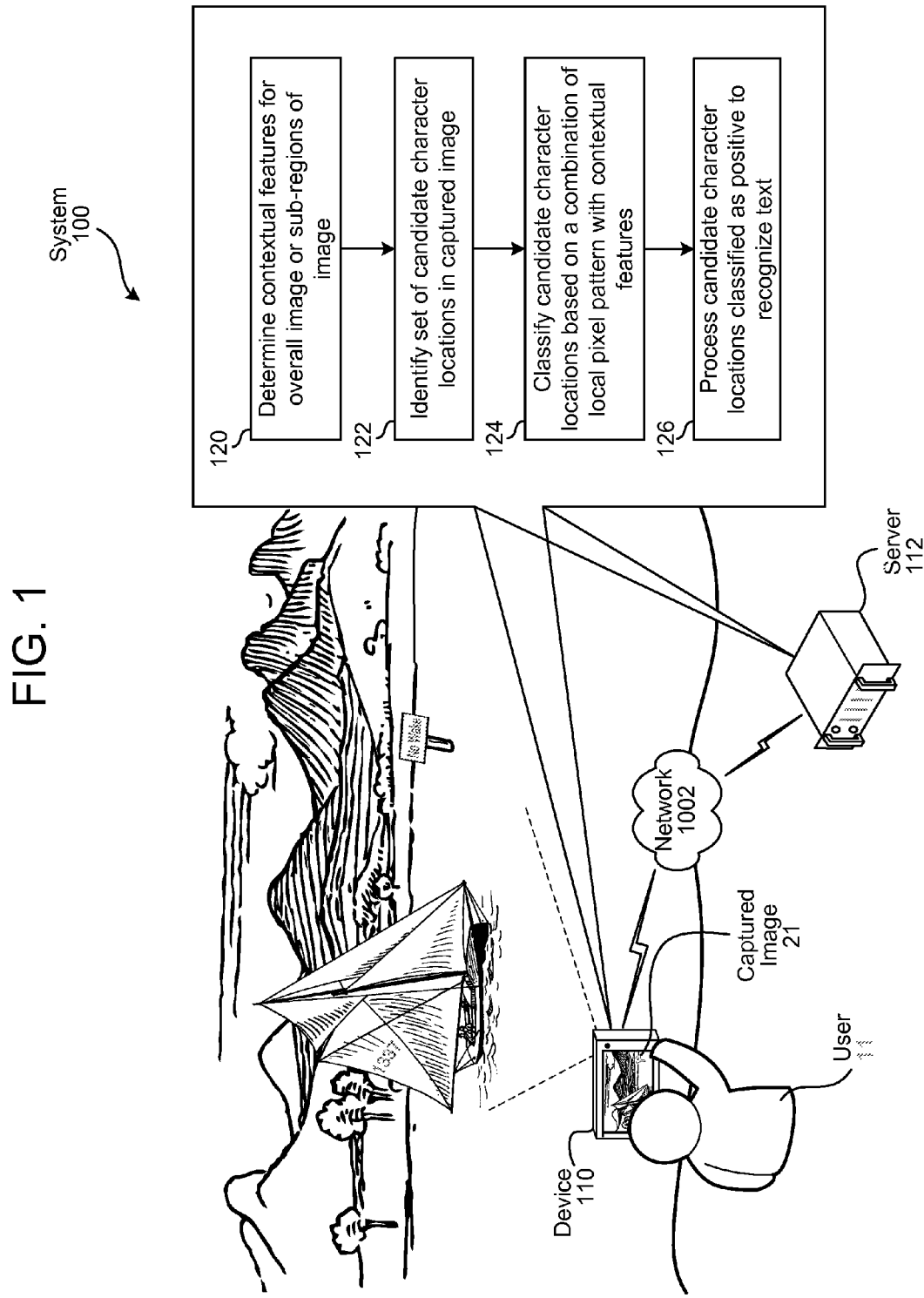
FIG. 1 illustrates a system for processing an image to identify text using contextual features.

FIG. 1 illustrates a system 100 for leveraging contextual features of an image for improved glyph classification and text detection using trained classifiers such as SVMs. The system 100 executes a process pipeline for detecting text regions contained in the captured image 21 captured by a user 11 using a device 110. The contextual features are (or are based on) a mathematical expression of content of the larger image that are processed by the trained classifier together with the regions that are identifies as potentially including text, improving text-detection accuracy. The process pipeline may be executed on the hand held device 110, or on a remote server 112 connected to the network via a network 1002, or divided there-between.

The contextual features are determined (120) for the overall image and/or for sub-regions of the image. A set of candidate character locations are identified (122) using a technique such as maximally stable external regions (MSERs). MSERs are a method of blob detection in images. Each "blob" contains a pixel intensity pattern that the MSER algorithm determines might convey a character or glyph, but further processing is required to determine whether each candidate region (i.e., each blob) contains an actual character or glyph.

The candidate regions are classified (124) by a trained classifier as containing text characters/glyphs or not containing text/glyphs based on local pixel patterns within each MSER in combination with the contextual features. The MSER regions that the classifier identifies as true character/glyph locations (e.g., regions having text) are then processed to recognize content, such as by optical character recognition (OCR) techniques. Among other benefits, the addition of the contextual features to the classification of the processing of candidate regions reduces the number of false positives and false negatives output by the trained classifier, providing improved results when applying OCR.

Figure 2:
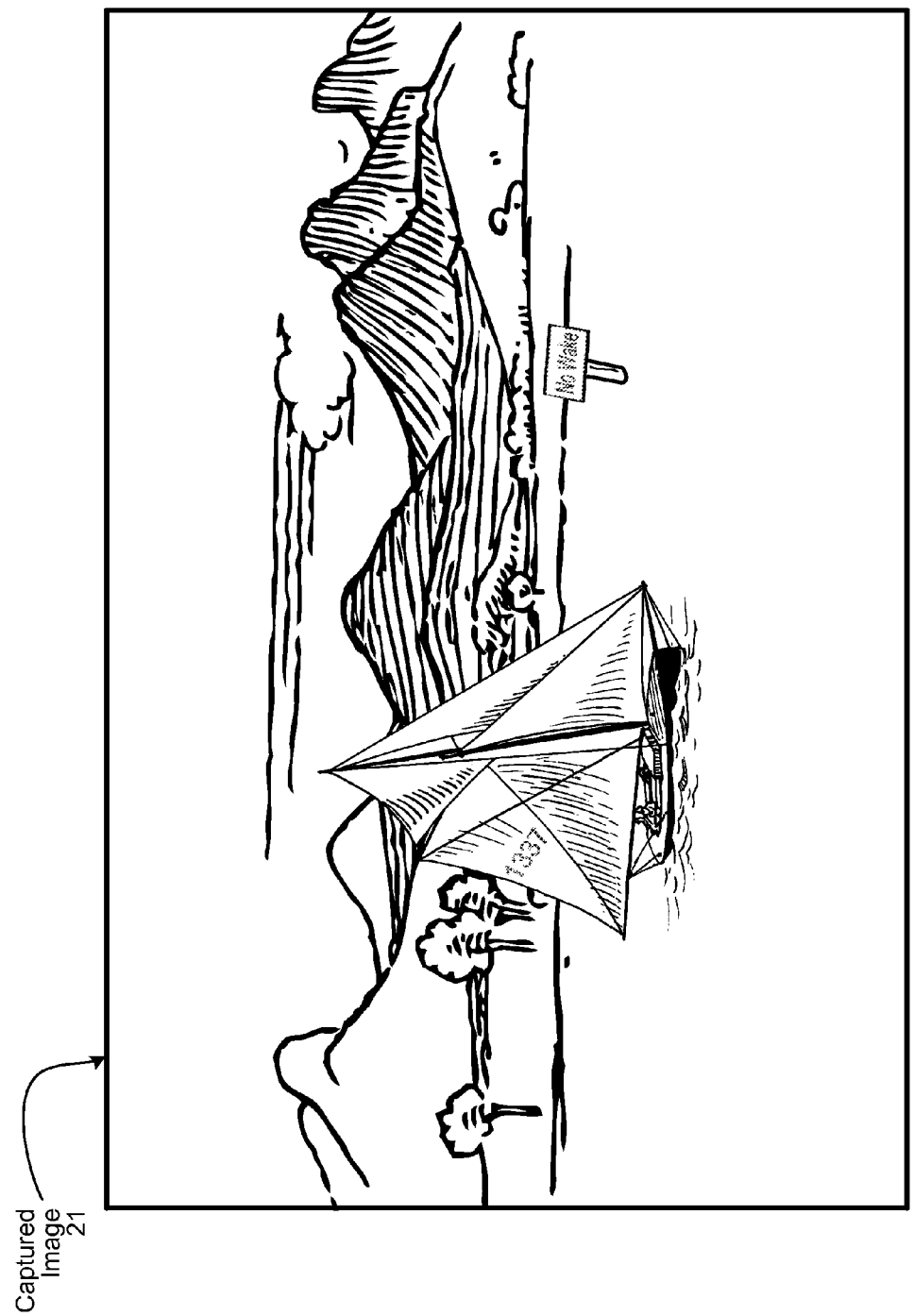
FIG. 2 illustrates a captured image containing text.
Figure 3A:
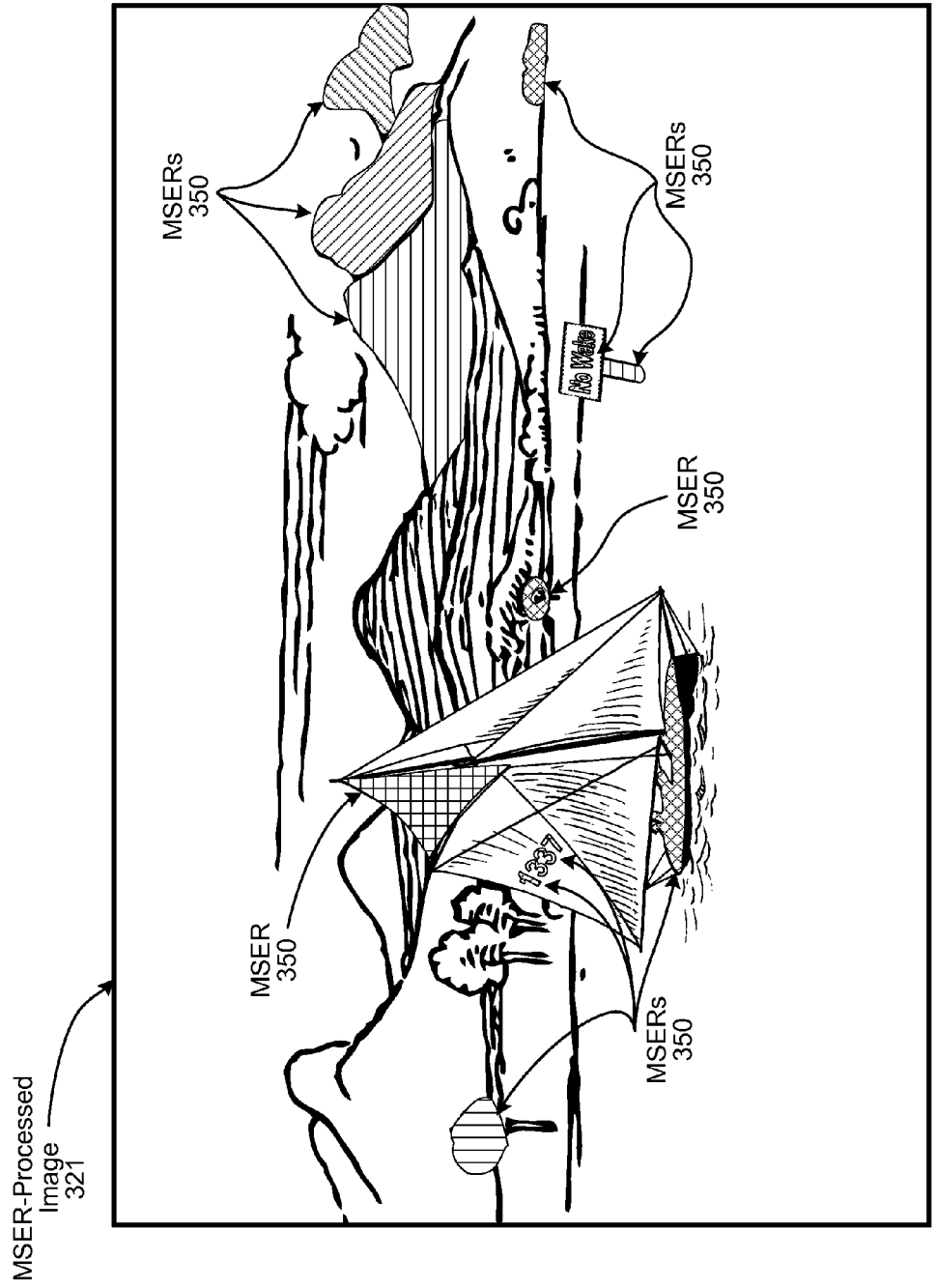
FIG. 3A illustrates identified candidate character locations in the captured image.

FIG. 2 illustrates a captured image 21 prior to image processing. FIG. 3A illustrates an MSER-processed image 321 where sets of potential character locations 350 have been identified in the captured image. Using the MSERs, a plurality of image elements may be identified as potentially containing text characters/glyphs and extracted. MSERs are well-suited to extracting elements where the image element is warped or skewed, and are relatively unaffected by variations in image intensities. As is known in the art, the MSER candidate locations 350 may be defined by a "feature vector" (an n-dimensional vector of numerical features) comprising an intensity function in the candidate location and the outer border. In the example illustrated in FIG. 3A, many of the MSER candidate locations 350 do not correspond to text/glyphs. Even so, the MSER algorithm reduces overall computational overhead by identifying the regions of the image that may contain text/glyphs, since determining whether a region is a true character location is ordinarily more computationally intensive than the MSER algorithm.

To locally classify each candidate character location as a true text character/glyph location, a set of features that capture salient characteristics of the candidate location is extracted from the local pixel pattern. A list of example characteristics that may be used for glyph classification is presented in Table 1, and will be explained in connection to FIGS. 3B to 3G:

TABLE 1

| Feature | Description |
| --- | --- |
| Aspect Ratio | (bounding box width/bounding box height) |
| Compactness | 4 * π * candidate glyph area/(perimeter)² |
| Solidity | candidate glyph area/bounding box area |
| Stroke-width to width ratio | maximum stroke width/bounding box width |
| Stroke-width to height ratio | maximum stroke width/bounding box height |
| Convexity | convex hull perimeter/perimeter |
| Raw compactness | 4 * π * (candidate glyph number of pixels)/(perimeter)² |
| Number of holes | number of holes in candidate glyph |

Figure 3C:
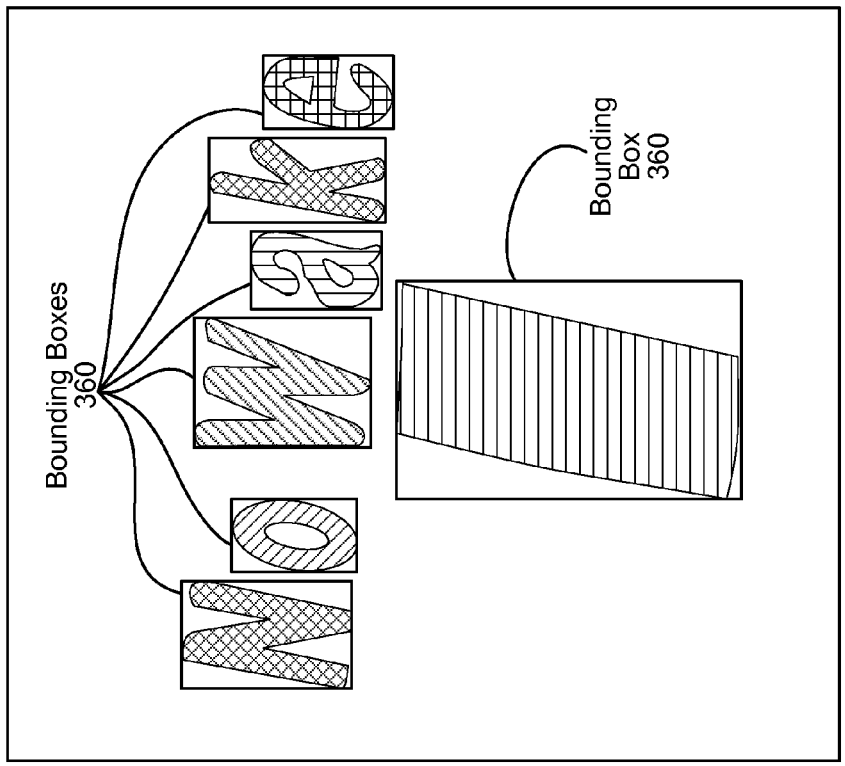
FIG. 3C illustrates extracted candidate characters in bounding boxes.
Figure 3B:
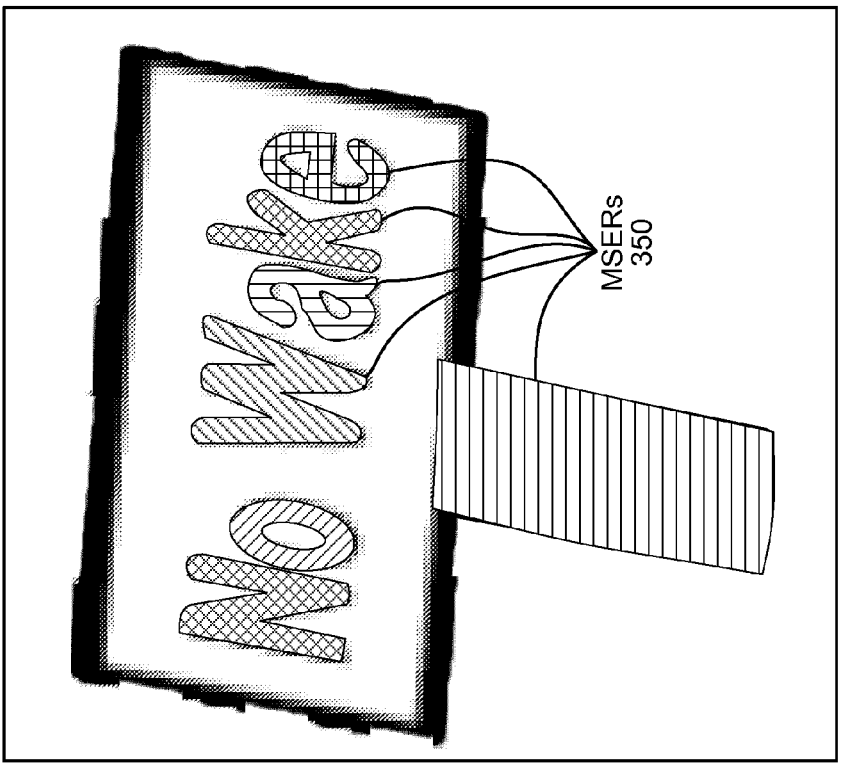
FIG. 3B illustrates a section from FIG. 3A, illustrating outlines of the candidate characters overlaid on the captured image.

FIG. 3B illustrates an example of MSERs 350 overlayed on a section of the captured image 21. The different patterns of the illustrated MSERs are provided to emphasize MSER boundaries, and do not have any significance to the respective MSER. FIG. 3C illustrates the extracted MSERs 350. A bounding box 360 is illustrated for each extracted MSER based on the respective MSER's height and width, relative to the orientation of the captured image 21. The "Aspect Ratio" glyph classification feature in Table 1 is determined for an individual candidate character by dividing the width of a bounding box divided by the bounding box height.

Figure 3D:
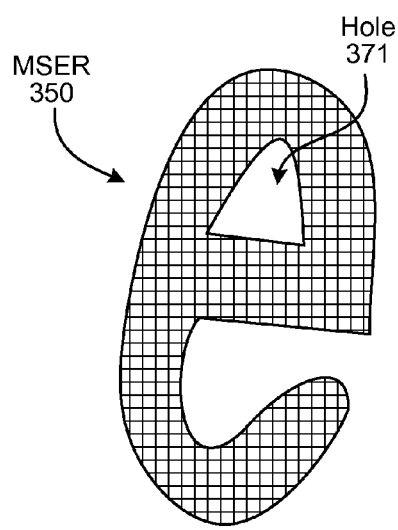
FIGS. 3D to 3G illustrate various features of an extracted candidate character that may be used to characterize the candidate character.
Figure 3E:
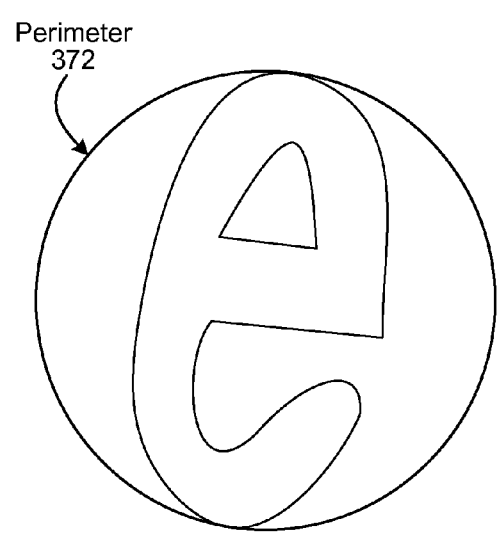

FIG. 3D illustrates an individual extracted candidate character as an MSER 350, which include one hole 371. The "area" of the candidate character corresponds to the shaded portion of the MSER 350. The "Compactness" is based on a ratio of the area of the shape to the area of a circle encompassing the shape. The "Compactness" of the candidate character is equal to four times the constant "Pi" times the area of the candidate character, divided by the square of the perimeter 372 of a circle encompassing the candidate character (illustrated in FIG. 3E). An estimate of the perimeter 372 may be determined based on a longest distance between two edges of the MSER 350. The "Solidity" of the candidate character is the area of the candidate character divided by the area of the bounding box 360 (i.e., bounding box height times width).

Figure 3F:
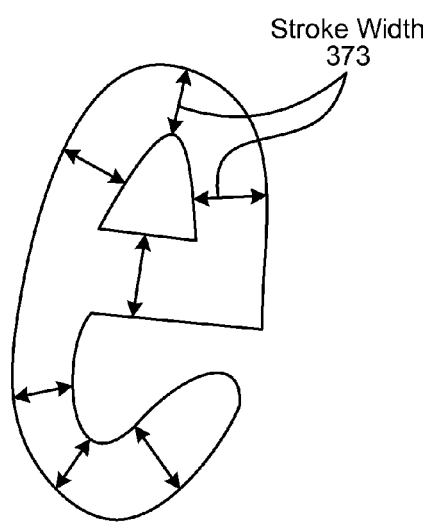
Figure 3G:
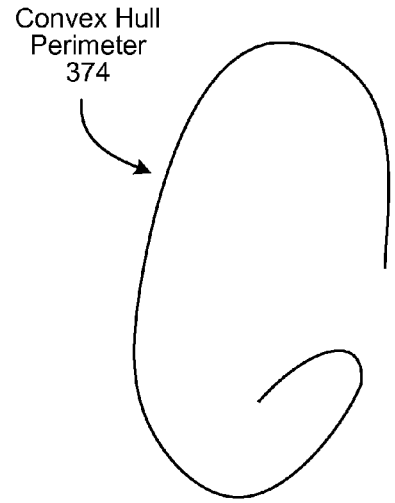

FIG. 3F illustrates various stroke widths 373 of the candidate character. One technique for measuring stroke width is to detect edges of the candidate character (e.g., using Canny edge detection), and then measure across the candidate character from one edge to an opposite edge. In particular, the measurement may be measured perpendicular to a tangent at one edge of the candidate character to a parallel tangent at an opposite edge. A maximum stroke width of the glyph is used to calculate the stroke-width to glyph-width ration and the stroke-width to glyph-height ratio. As text characters in most languages have consistent stroke widths throughout the glyph, stroke widths 373 that exhibit significant variation (e.g., exceeding a standard deviation of all stroke widths by a threshold value) may optionally be ignored when determining the maximum stroke width for classification.

Referring back to Table 1, "Stroke-Width to Width ratio" is the maximum stroke width of a candidate character divided by the width of the character's bounding box 360. Similarly, "Stroke-Width to Height ratio" is the maximum stroke with of a candidate character divided by the height of the character's bounding box 360.

"Convexity" is a candidate character's convex hull perimeter 374 (illustrated in FIG. 3G) divided by the perimeter 372. The edges of a candidate character may be expressed as a sequence of lines and curves. The convex hull perimeter 374 corresponds to peripheral portions of the MSER 350 that exhibit convex edges. "Raw Compactness" is equal to four times the constant Pi times the number of pixels comprising the candidate character divided by the perimeter 372.

A classifier system is trained from a training set containing a mix of true positives for characters and negatives for characters/glyphs (i.e., test images not having text). For a test image, the same feature set is extracted from the detected candidate regions and a trained classifier is applied to identify true character locations. The trained classifier may be (among other things) a classifier system such as a Support Vector Machine (SVM) classifier employing a Radial Basis Function (RBF) kernel. The training set includes pre-selected images with sections that are already known to either include text or not include text. For example, the classifier is trained on images known to have various regions with characters and various regions without characters as obtained by manually annotating MSERs extracted from the pre-selected real-world images. The features used by the character classifier tend to be insensitive to differences in fonts and alphabets.

The classifier system may be trained by extracting features such as those in Table 1 that capture salient patterns of the candidate glyph such as gradient patterns or intensity patterns. The features in Table 1 are examples, and other features may be used. Also, not all of the features in Table 1 may be used, and if other features are used, the examples in Table 1 may optionally be omitted or combined with the other features.

The classifier system is trained to recognize patterns as corresponding or not corresponding to text/glyphs based on a representation of the content of the region that is provided to the classifier system as input. Among expressions of content that may be used as input are gradient patterns and intensity patterns of the pixels within each MSER region.

Instead of or in combination with an SVM, other classifier systems may be used, such as neural networks, decision trees, AdaBoost (short for "Adaptive Boosting") combined with decision trees, and random forests. Also, instead of MSERs, or in conjunction with MSERs, candidate locations may be identified using histogram of oriented gradients (HoG) and Gabor features.

HoGs are feature descriptors used in computer vision and image processing for the purpose of object detection. The HoG technique counts occurrences of gradient orientation in localized portions of an image, and is similar to that of edge orientation histograms, scale-invariant feature transform descriptors, and shape contexts. However, HoG is different from these other techniques in that it is computed on a dense grid of uniformly spaced cells and uses overlapping local contrast normalization for improved accuracy. Locally-normalized HoG descriptors offer particular performance advantages relative to other existing feature sets, computed on a dense grid of uniformly spaced cells and using overlapping local contrast normalizations.

Gabor features are identified by a Gabor filter, which is a linear filter used for edge detection. Frequency and orientation representations of Gabor filters are similar to those of the human visual system, and they have been found to be particularly appropriate for texture representation and discrimination. In the spatial domain, a two-dimensional Gabor filter is a Gaussian kernel function modulated by a sinusoidal plane wave, applying image decompositions to identify and recognize objects.

The features captured by techniques such as MSERs, HoG, and Gabor features convey only information that is local to the candidate location and does not take into account the context of the overall scene in which the image is captured. As an improvement upon existing techniques for text and symbol detection, the classification of candidate character locations may be further based in part on contextual features of the overall image or sub-regions of the image. The context of a scene in which an image is captured may impact the probability of finding text regions. For example, an image of a piece of paper on a desk is more likely to contain text than one captured outdoors of a beach. Contextual features of the image or a subregion of the image are added to the features of the candidate text regions to improve classification of candidate regions as either containing or not containing text. The training images used to train the classifier system likewise include contextual feature information, with the added expression of context reducing false positives and false negatives in the operational system.

In addition, as will be discussed further below, a second trained classifier may be added to provide a "gating" function, determining whether the contextual features of an image or sub-region of the image are similar to training images of scenes that contain text or are similar to scenes that do not contain text. For example, images of the sky are unlikely to contain text, while images of a billboard are likely to contain text. The second classifier does not need to identify that the image or sub-region contains the billboard or sky, but rather, compares contextual features of the captured image/sub-regions with classifier models generated from the contextual features of training images to determine whether the contextual features may be associated with text. If the contextual features are similar to training images that do not contain text, the system can forgo further processing of that image or subregion (e.g., skip identification of candidate text regions and/or OCR).

Figure 4:
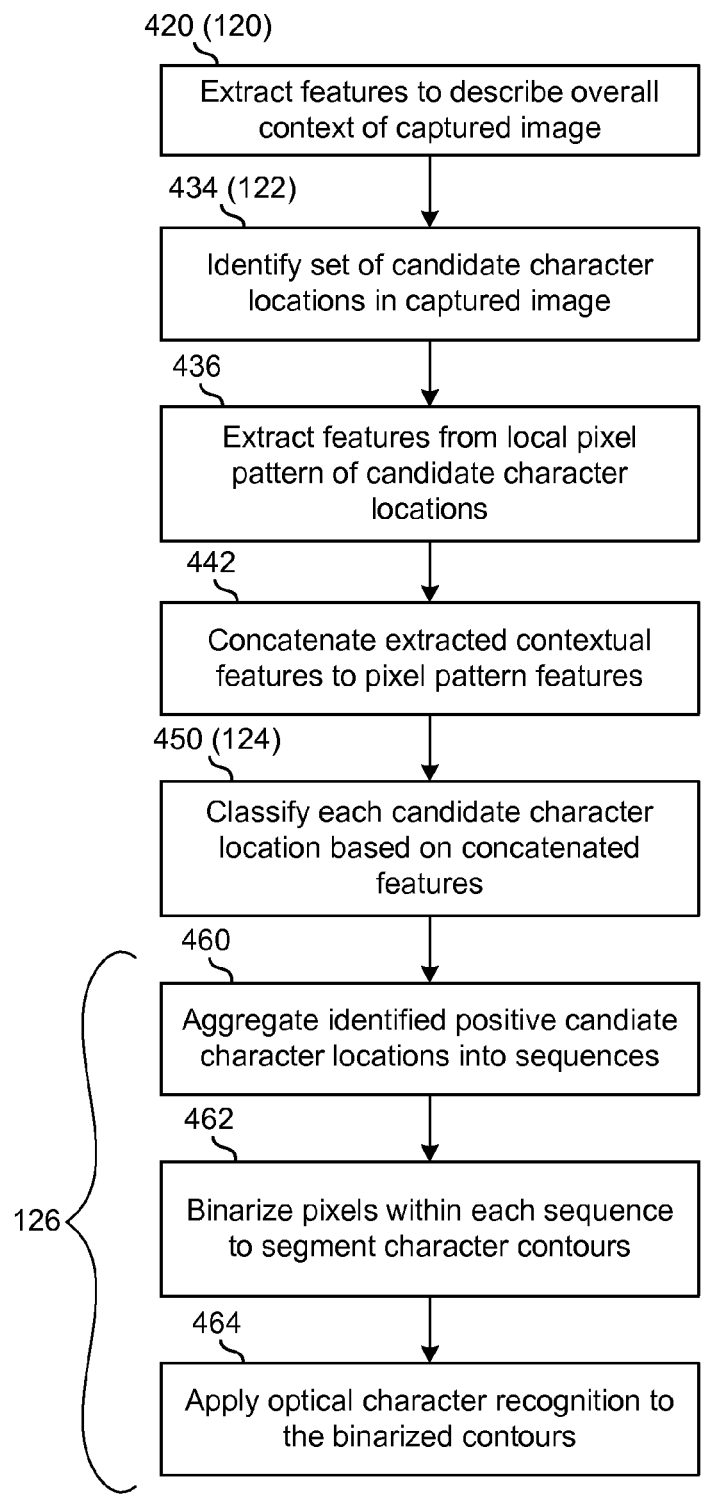
FIG. 4 illustrates a process to identify text using contextual features of an image.

FIG. 4 illustrates an example of the process using full-image context. Contextual features are extracted (420) to describe the overall context of the captured image. Examples of image processing techniques that may be used to extract the contextual features include a Bag-of-Words (BoW), Kernel Codebooks, and Fisher Vectors. Each of these techniques produces a numerical representation of an image or subregion of an image that may be used input for a classifier. These techniques may also be used in combination.

For background explanation, an example of scene categorization using the Bag-of-Words process pipeline is described by G. Csurka, C. R. Dance, L. Fan, J. Willamowski, and C. Bray in "Visual Categorization with Bags of Keypoints," published in Workshop on Statistical Learning in Computer Vision, European Conference on Computer Vision (ECCV) 2004. An example of scene categorization using Kernel Codebooks is described by J. C. van Gemert, J. M. Geusebroek, C. J. Veenman, and A. W. M. Smeulders in "Kernel Codebooks for Scene Categorization," published in Computer Vision, ECCV 2008. An example of scene categorization using Fisher Vectors is disclosed by J. Sanchez, F. Perronnin, T. Mensink, and J. Verbeek in "Image Classification with the Fisher Vector: Theory and Practice," published in the International Journal on Computer Vision (IJCV) 2013, Vol. 105, No 3.

Using Bag-of-Words, features are detected and described, the feature descriptors are aggregated, and the aggregated descriptors are then quantized based on a codebook, such that the final feature vector contains quantized "codewords." The use of codebooks simplifies the information to be processed by the classifier, reducing the computational complexity of the overall classification process.

Feature detection and description starts at an image pixel level, generating feature "descriptors" based on spatial relationships (e.g., gradient and intensity patterns) between pixels. Any of several algorithms to detect and describe local features may be used. Examples of such algorithms known in the art include a scale-invariant feature transform (SIFT), speeded up robust features (SURF), color SIFT, and local binary patterns (LBP). Each of these algorithms produces multi-dimensional vectors of numerical features (i.e., feature vectors) representing localized areas of the input image or sub-region (e.g., two-dimensional gradient or intensity patterns).

A background example describing the SIFT process is by D. G. Lowe, "Object recognition from local scale-invariant features," published in the Proceedings of the International Conference on Computer Vision, Corfu, Greece, pages 1150-1157, in 1999. A background example describing the SURF process is by H. Bay, A. Ess, T. Tuytelaars, and L. Van Gool, "SURF: Speeded Up Robust Features," published in Computer Vision and Image Understanding (CVIU), Vol. 110, No. 3, pages 346-359, in 2008. A background example describing the color SIFT process is by K. E. A. van de Sande, T. Gevers and C. G. M. Snoek, "Evaluating Color Descriptors for Object and Scene Recognition," published in IEEE Transactions on Pattern Analysis and Machine Intelligence, Vol. 32, No. 9, pages 1582-1596, in 2010. A background example describing the LBP process is by T. Ojala, M. Pietikäinen, and D. Harwood, "Performance evaluation of texture measures with classification based on Kullback discrimination of distributions," published in the Proceedings of the 12th IAPR International Conference on Pattern Recognition (ICPR 1994), Vol. 1, pages 582-585.

The Bag-of-Words process aggregates the resulting plurality of local feature vectors, and then compares the aggregated feature vectors to a codebook to produce a quantized expression that is utilized as the extracted contextual features.

For example, SIFT may generate thousands of one-hundred-twenty-eight dimensional feature vectors, where each of the feature vectors represents a two-dimensional histogram at a different location in the image. These localized feature vectors are then aggregated, and the aggregated feature vector is then quantized into a codeword based on a codebook. The resulting codeword is a quantized representation of the extracted contextual features.

A set of candidate character locations is identified (434) in the captured image 21, such as by applying an MSER detection algorithm (or HoG, Gabor features, etc.). A background example describing MSER detection algorithms is by J. Matas, O. Chum, M. Urban, and T. Pajdla. in "Robust wide baseline stereo from maximally stable extremal regions," published in the Proceedings of the British Machine Vision Conference, pages 384-396, in 2002.

As noted above, other image processing algorithms may be used instead of, or in combination with, MSER detection algorithms in order to identify candidate character locations in the captured image, such as using HoG or Gabor features. For background explanation, an overview of HoG methodology is disclosed by N. Dalal and B. Triggs in "Histograms of oriented gradients for human detection," published in the proceedings of the IEEE Computer Society conference on Computer Vision and Pattern Recognition, Vol. 1, pages 886-893, in 2005. An example of a feature discrimination model utilizing Gabor filters is disclosed by Fogel, I. and Sagi, D. in "Gabor filters as texture discriminator," published in Biological Cybernetics, Vol. 61, Issue 2, in 1989.

Candidate glyph features are extracted (436) from local pixel patterns of each of the candidate text character regions (e.g., MSERs 350) as discussed above in connection with Table 1 and FIGS. 3A to 3G. The extracted features are converted into a feature vector, which is an n-dimensional vector of numerical features that represent an object or objects within the candidate character location.

The extracted contextual features are concatenated on to the candidate character features. So instead of having the classifier determine whether a candidate region includes a text character/glyph based on only the pixel pattern features of the candidate glyph, the classifier receives added information in the form of the contextual features.

Each concatenated feature vector is processed to classify (450) candidate locations (e.g., MSERs 350) based on the extracted features (e.g. Table 1) plus the contextual features using a trained classifier. The trained classifier may be (among other things) a classifier system such as a Support Vector Machine (SVM) classifier employing a Radial Basis Function (RBF) kernel, a neural networks, decision trees, AdaBoost (short for "Adaptive Boosting") combined with decision trees, and random forests.

Candidate locations (e.g., MSERs 350) that are classified as containing characters are then aggregated (460) into sequences. The sequences arrange adjacent characters. For example, if each letter of a word was identified by a different MSER, the sequence of letters would be the word. The pixels within each sequence are then binarized (462) to segment character contours. Binarizing (e.g., converting into white or black) emphasizes the edged of each character. Once binarized, optical character recognition may be applied (464) to the binarized contours, recognizing the characters and text sequences.

Figure 5A:
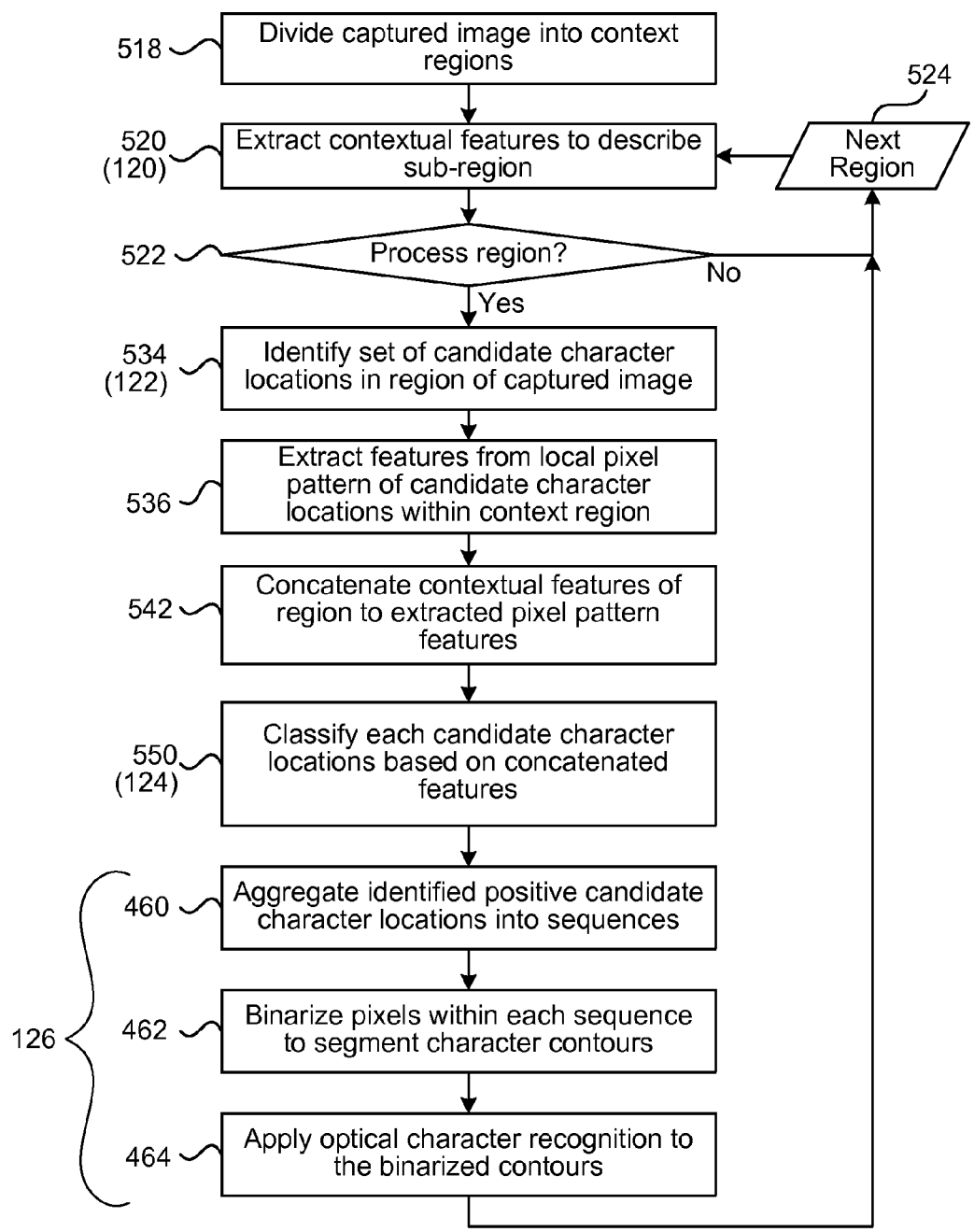
FIG. 5A illustrates a process to identify text based in part on contextual features determined from spatial regions of an image.

FIG. 5A illustrates a modified version of the process in FIG. 4 where the captured image is divided into multiple smaller spatial sub-regions (518) and features are extracted to describe a context of each spatial region (520). The sub-regions may be, for example, the four quadrants of the captured image 21, three-vertical or horizontal stripes of the captured image 21, etc. Different sub-region geometries may also be used, and the number of sub-regions may be increased or decreased.

Figure 6:
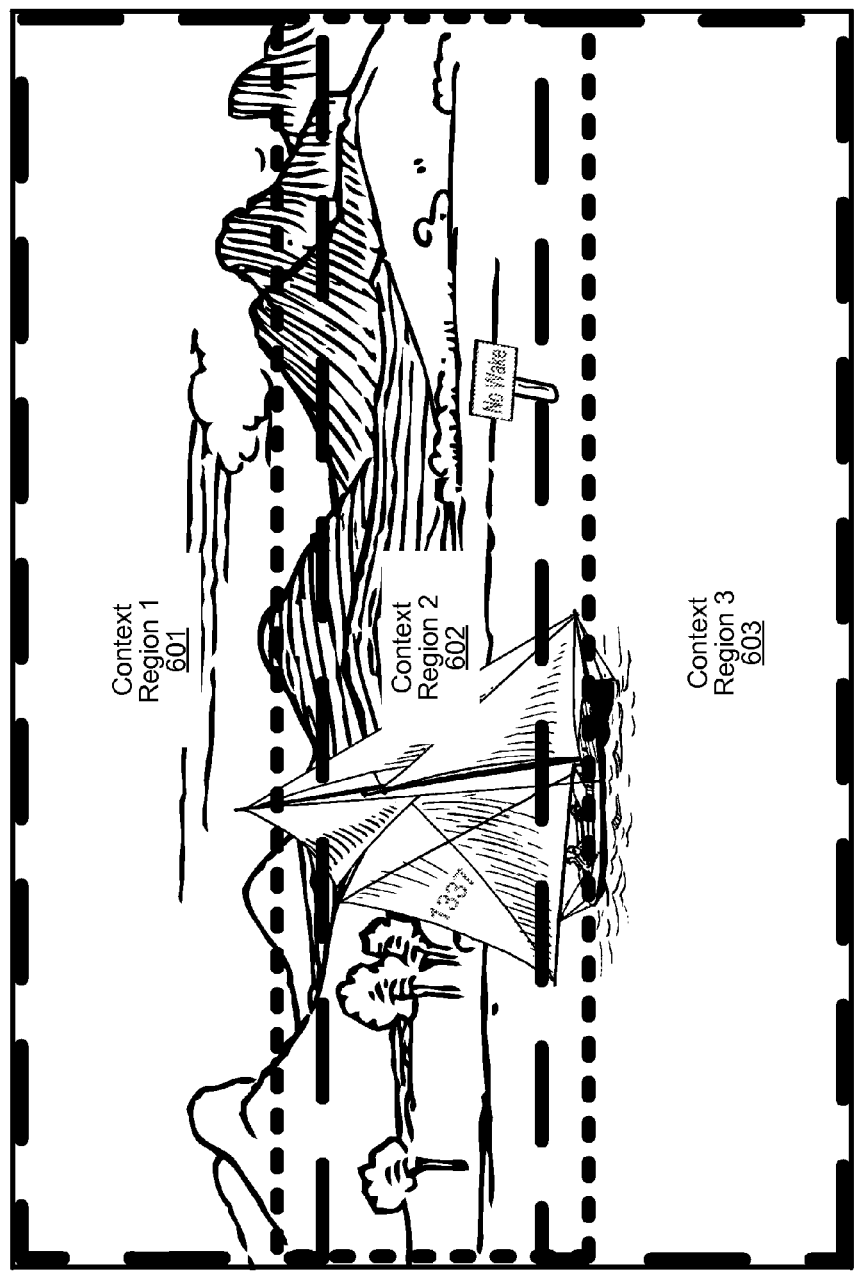
FIG. 6 illustrates an example of the captured image divided into overlapping spatial regions.

For example, FIG. 6 illustrates the captured image 21 divided into three horizontal stripes, with each horizontal stripe serving as a context region (601, 602, 603). The spatial context regions (e.g., 601 to 603) may be overlapping. Since computing image level features are slow and can impact latency significantly, resizing the captured image into multiple small windows may reduce computational complexity.

Extracting features for a sub-region is performed by the process in FIG. 5A in the same manner as was described with FIG. 4, such as by using a Bag-of-Words process, a Kernel Codebook process, and/or a Fisher Vector process. However, the process in FIG. 5A adds a gating function, where a determination (522) is made as to whether to process the sub-region for text. This determination 522 is made by a second classifier system trained with images specified as containing text and not containing text.

The "gating" classifier system does not actually determine whether there is text in the image, but whether the contextual features extracted from the input sub-region of the image are consistent with training data associated with text. For example, a classifier system may be trained with images of the sky, forests, and oceans, as images unlikely to contain text, and images of signs, billboards, offices, and libraries as images likely to contain text. Since the gating classifier does not actually determine whether the sub-region (e.g., 601-603) includes text characters or other glyphs, the determination of whether to process the region (522) reflects a probability that the sub-region does or does not contain text, such that some sub-regions that contain text may be rejected for further processing and some sub-regions that contain no text may be selected for further processing.

If the gating classifier determines that the contextual features for the sub-region is unlikely to contain text (522 "No"), processing proceeds (524) to a next region, if there are further regions to process. This sub-region processing may also be performed in parallel, with contextual features extracted for multiple sub-regions as input for the gating classifier.

If the contextual features of a sub-region are associated with text/symbols (e.g., a library, an office) then the candidate locations are further processed (522 "Yes"). As describe with FIG. 4, candidate character locations are identified (534) within the region (e.g., MSERs, HoGs, Gabor features, etc.), and features are extracted (536) from each candidate location to produce a feature vector. Each feature vector for a candidate location is then concatenated (542) with the contextual features for the sub-region, and each concatenated feature vector is then used for classification (550) as to whether a candidate region (e.g., MSERs, HoGs, etc.) does or does not contain text.

The differences between this process in FIGS. 4 and 5A are the addition of the gating function in FIG. 5A, and that in FIG. 4 the candidate character locations that are processed are those of the overall image, whereas in FIG. 5A, whether candidate locations are identified and extracted depends upon how the sub-region they fall within is classified by the gating classifier. The gating function may be omitted from the process in FIG. 5A (omitting 522), with the candidate character locations being processed one region at a time, with the contextual features that are concatenated (542) onto the pixel pattern features (e.g., Table 1) being those of the sub-region instead of the entire image. In addition, the gating feature of FIG. 5A can be added to the process in FIG. 4, with the gating function determining whether to further process the entire captured image 21.

As noted above, FIG. 6 illustrates the captured image divided into three overlapping spatial context regions 601 to 603. Based on salient features such as gradient and/or intensity features, the gating classifier might associate training images of "sky" with the contextual features of the first spatial context region (601). If training image of the sky were identified as not containing text or glyphs, the association will result in the gating classifier determining not to process the region (522 "No"). A similar determination not to process the region may be reached for the third context region 603, which predominantly includes water.

However, the second context region 602 contains additional complexity. The gating classifier may score the second context region 602 above a threshold value that associates the second context region 602 with training images identified as containing text, or the score may fall below a threshold that renders the context features of the second context region 602 as indeterminate. Context features may be indeterminate if the gating classifier was not trained with data for the quantized code words, or if an un-quantized multi-dimensional aggregated vector is provided as input instead of a quantized code word. In either case, the sub-region may processed (522 "Yes") for the determination as to whether it contains text. In the alternative, the process may be configured to not process context regions that are indeterminate.

Figure 5B:
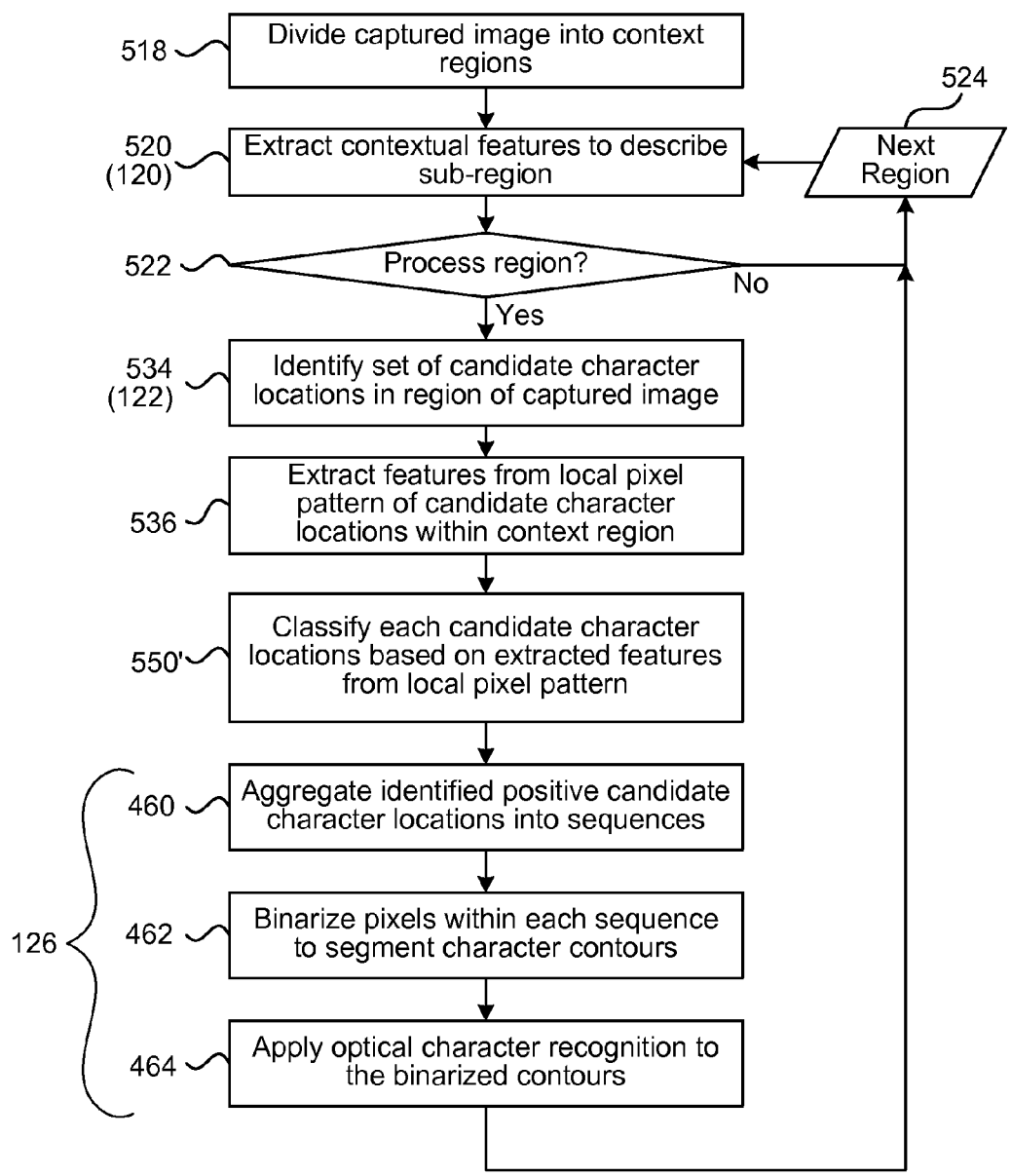
FIG. 5B illustrates a modified version of the process in FIG. 5A.

As illustrated in FIG. 5B, as an alternative implementation of the process in FIG. 5A, the gating function (522) may be performed as described, but the classification of each candidate character location may be based on the extracted features from the local pixel pattern of the respective candidate character locations (from 536; e.g., Table 1), omitting the concatenation of contextual features to the feature vector (omitting 542 from FIG. 5A, resulting in a modified 550'). By retaining the gating function based on contextual features, context regions unlikely to contain text or glyphs may be skipped, reducing computational overhead. Also, by omitting the contextual features from the classification of the candidate character locations, systems that use classifiers trained for text/glyph classification may benefit from the advantages of the gating function without requiring additional training of the text/glyph classifier for text features-plus-context features.

Figure 7:
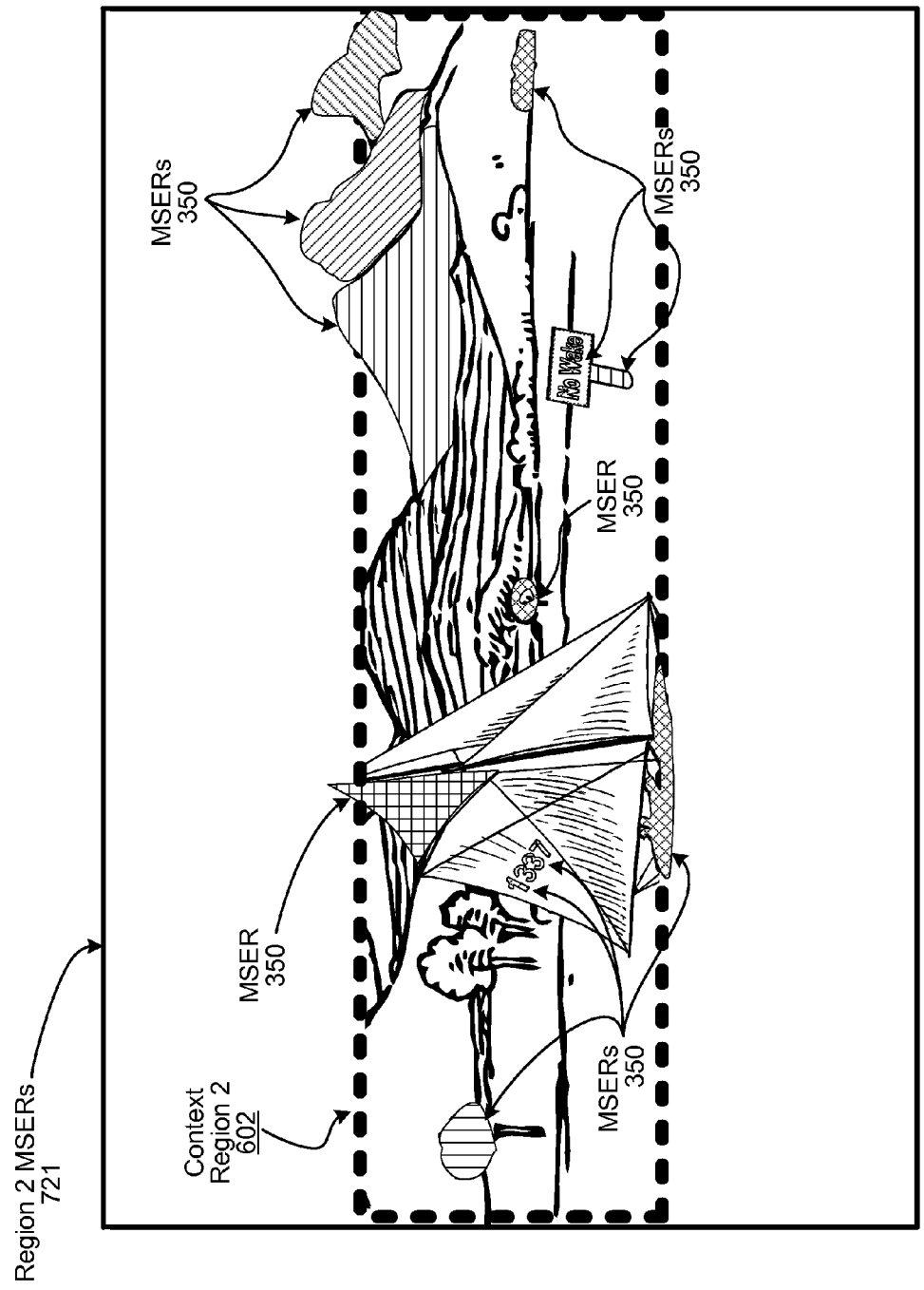
FIG. 7 illustrates candidate character locations included in a spatial regions.

FIG. 7 illustrates further processing that may occur when the extracted contextual features in the second context regions 602 are associated with training data associated with the presence of text (i.e., gating step 522 "Yes"). If a candidate location spans an area both inside and outside the context region, the context region may be dynamically resized and/or the candidate character locations may be extended beyond the boundaries of the context region.

When the classifier system processes the candidate location data concatenated with contextual features to classify (450, 550) the candidate character locations (e.g., MSERs 350), a weak correlation between contextual features and text characters may reduce the likelihood that a candidate character location will be identified as a false-positive for containing characters. In comparison, a strong correlation between contextual features and text characters may reduce the occurrence of false-negatives for candidate locations associated with such contexts.

Table 2 illustrates an example of the detection rate for test images based on the process in FIG. 5A. The "baseline" was the ability of the process to correctly identify certain text features in captured test images (not illustrated) without data regarding the context. By adding contextual features, a modest improvement was seen in the results, improving the overall performance from 73.9% accuracy to 75.2% accuracy. The improvement was seen across different samples.

TABLE 2

|  | Email | URL | Phone | Username | Domain | Aggregate |
|---|---|---|---|---|---|---|
| Baseline | 67.3% | 69.8% | 82.2% | 72.6% | 70.3% | 73.9% |
| Baseline + Context | 67.9% | 71.1% | 84.0% | 73.1% | 71.9% | 75.2% |

Figure 8:
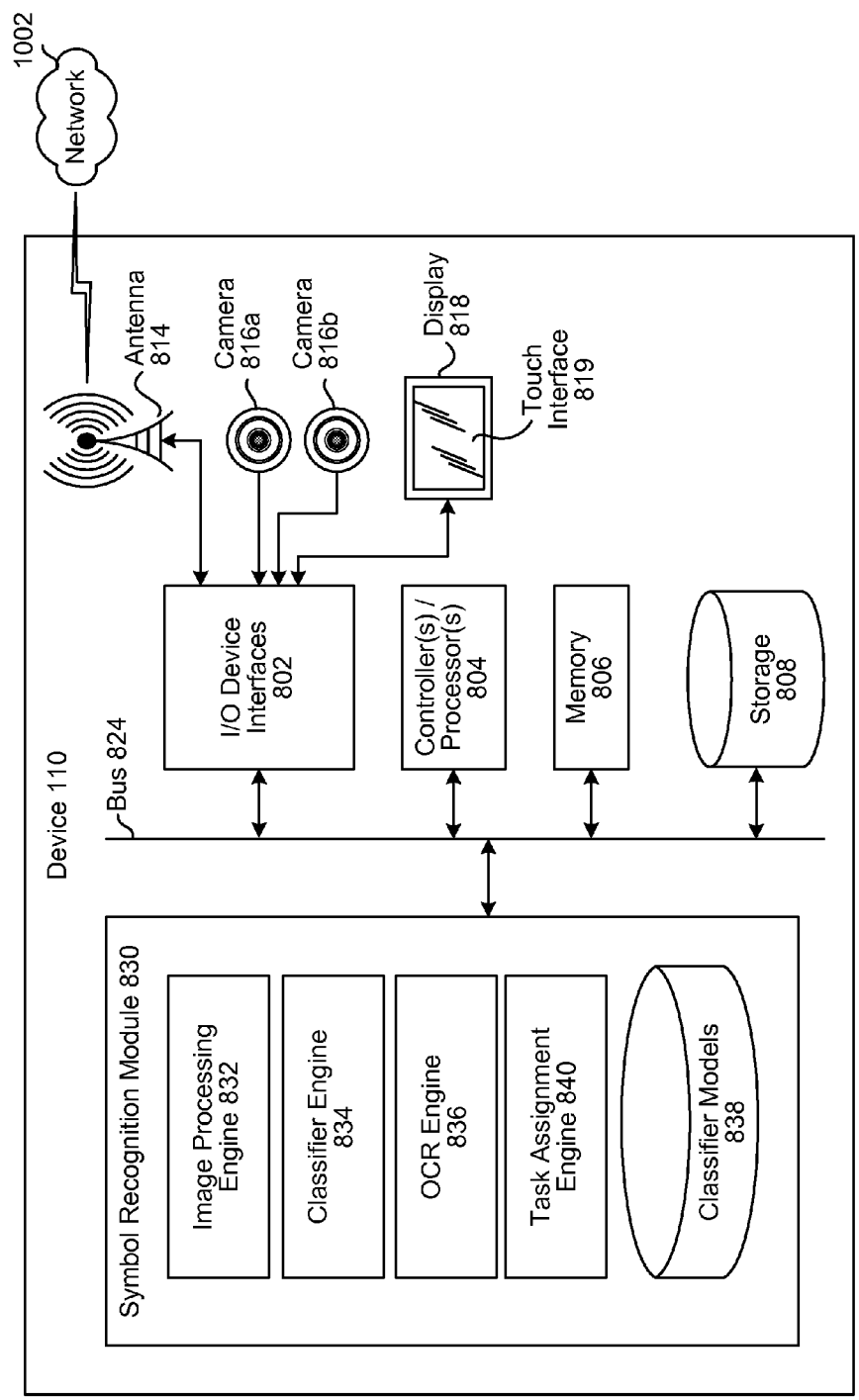
FIG. 8 is a block diagram conceptually illustrating example components of a device to identify text using contextual features.

FIG. 8 is a block diagram conceptually illustrating example components of the handheld device 110 of the system 100. In operation, the device 110 may include computer-readable and computer-executable instructions that reside on the device 110, or that may reside on a network-connected device operating in conjunction with device 110, as will be discussed further below.

As illustrated in FIG. 8, the device 110 may include wireless network radio connectivity (e.g., antenna 814), one or more cameras (816a, 816b), a display 818, and a user interface such as touch interface 819. If multiple cameras are included, at least two of the cameras may be arranged to capture stereo images, as some candidate character location identification (e.g., 122, 434, 534) algorithms are designed to operate on stereo images. "Camera" includes image capture systems used to capture images, and includes (among other things), cameras used for photography and for the capture of video. Image scanners such as flat-bed optical scanners may be substituted for a camera to capture the image 21.

The display 818 may be a display of any suitable technology, such as a liquid crystal display, an organic light emitting diode display, electronic paper, an electrochromic display, or other suitable component(s). The cameras 816, display 818, and other components may be integrated into the device 110, or may be separate, connected to the device 110 by a wired or wireless connection.

The device 110 may include an address/data bus 824 for conveying data among components of the device 110. Each component within the device 110 may also be directly connected to other components in addition to (or instead of) being connected to other components across the bus 824.

The device 110 may include one or more controllers/processors 804, that may each include a central processing unit (CPU) for processing data and computer-readable instructions, and a memory 806 for storing data and instructions. The memory 806 may include volatile random access memory (RAM), non-volatile read only memory (ROM), non-volatile magnetoresistive (MRAM) and/or other types of memory. The device 100 may also include a data storage component 808, for storing data and controller/processor-executable instructions (e.g., instructions to perform the processes illustrated in FIGS. 1, 4, 5A, and 5B). The data storage component 808 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 802.

Computer instructions for operating the device 110 and its various components (such as the engines 832 to 836 and 840 of the symbol recognition module 830) may be executed by the controller(s)/processor(s) 804, using the memory 806 as temporary "working" storage at runtime. The computer instructions may be stored in a non-transitory manner in non-volatile memory 806, storage 808, or an external device. Alternatively, some or all of the executable instructions may be embedded in hardware or firmware in addition to or instead of software.

The device 110 includes input/output device interfaces 802. A variety of components may be connected through the input/output device interfaces 802, such as the display 818, a speaker (not illustrated), a microphone (not illustrated), and the user interface (e.g., touch interface 819). The input/output device interfaces 802 may also include an interface for an external peripheral device connection such as universal serial bus (USB), Thunderbolt or other connection protocol. The input/output device interfaces 802 may also include a connection to one or more networks 1002 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1002, the system 100 may be distributed across a networked environment, as will be discussed further below with FIG. 10.

The device 110 further includes a symbol recognition module 830 that leverages image context for improved glyph classification and text detection. The symbol recognition module 830 performs the processes discussed in connection with FIGS. 1, 4, 5A, and 5B, and/or works in conjunction with another device in the system 100. For example, a first device 110 may include the camera(s) 816 and capture the image 21, whereas a second device 110 (or a server 112) includes all or part of the symbol recognition module 830 that processes the captured image 21.

The symbol recognition module 830 includes an image processing engine 832. Among other things, the image processing engine 832 extracts contextual features (120, 420, 520), identifies the set of candidate character locations (e.g., MSERs, HoGs, etc.) (122, 434, 534), extracts features from local pixel patterns in each of the candidate character locations (436, 536), aggregates the identified positive regions into sequences (460), and binarizes the pixels (462). The image processing engine 832 may also divide the captured image into spatial regions (518). If any other pre-processing of the image is performed prior to classification, that may also be performed by the image processing engine 832.

A classifier engine 834 of the symbol recognition module 830 may be used to classify candidate character locations (124, 450, 550) based in part on the contextual features concatenated onto the candidate text location feature vectors, on contextual features alone (as the gating function 522), and/or on the candidate text location feature vectors (550'). The classifier engine 834 performs the gating function (522) using a different classifier models (stored in classifier storage 838) than is used for text classification (124, 450, 550, 550'). Among other things, the classifier system 834 may be a Support Vector Machine (SVM) classifier employing a Radial Basis Function (RBF) kernel, a neural network, decision trees, AdaBoost (short for "Adaptive Boosting") combined with decision trees, and random forests. The classifier model or models are stored in classifier storage 838, which may be a section of storage 808. Whether input descriptors are "positively" or "negatively" classified may be based on, among other things, whether a score resulting from a comparison of descriptor data with the established model indicates that similarities and/or differences exceeds threshold values.

An optical character recognition (OCR) engine 836 of the symbol recognition module 830 may process the symbol-positive regions to recognize contained text (e.g., alphanumeric text) (126, 464). Any OCR algorithm or algorithms may be used, as known in the art.

Figure 9:
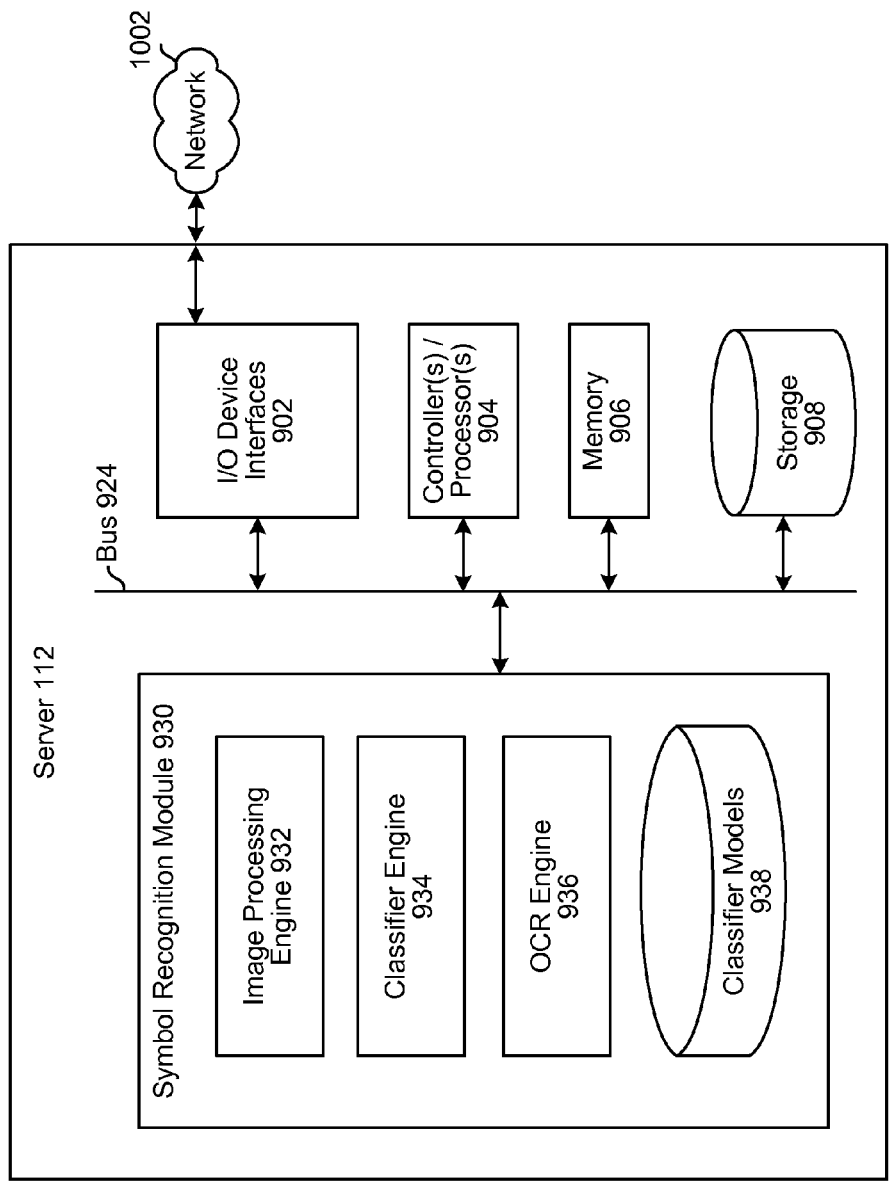
FIG. 9 is a block diagram conceptually illustrating example components of a network-connected server for processing an image captured by a device to identify text using contextual features.

FIG. 9 is a block diagram conceptually illustrating example components of the server 112 of the system 100. While some devices 110 that capture the image 21 may be able to execute their own processing pipeline, the task assignment engine 840 of a device 110 may delegate some tasks to the server 112 to process the captured image 21 (e.g., delegating OCR 464 processing to the server 112). In operation, the server 112 may include computer-readable and computer-executable instructions that reside on the server 112.

The server 112 may include an address/data bus 924 for conveying data among components of the server 112. Each component within the server 112 may also be directly connected to other components in addition to (or instead of) being connected to other components across the bus 924.

The server 112 may include one or more controllers/processors 904, that may each include a central processing unit (CPU) for processing data and computer-readable instructions, and a memory 906 for storing data and instructions. The memory 906 may include volatile random access memory (RAM), non-volatile read only memory (ROM), non-volatile magnetoresistive (MRAM) and/or other types of memory. The server 112 may also include a data storage component 908, for storing data and controller/processor-executable instructions (e.g., instructions to perform the processes illustrated in FIGS. 1, 4, 5A, and 5B). The data storage component 908 may include one or more non-volatile storage types such as magnetic storage, optical storage, solid-state storage, etc. The server 112 may also be connected to removable or external non-volatile memory and/or storage (such as a removable memory card, memory key drive, networked storage, etc.) through the input/output device interfaces 902.

Computer instructions for operating the server 112 and its various components (such as the engines 932 to 936 of the symbol recognition module 930) may be executed by the controller(s)/processor(s) 904, using the memory 906 as temporary "working" storage at runtime. The computer instructions may be stored in a non-transitory manner in non-volatile memory 906, storage 908, or an external device. Alternatively, some or all of the executable instructions may be embedded in hardware or firmware in addition to or instead of software.

The server 112 includes input/output device interfaces 902. A variety of components may be connected through the input/output device interfaces 902. The input/output device interfaces 902 may also include an interface for an external peripheral device connection such as universal serial bus (USB), Thunderbolt or other connection protocol. The input/output device interfaces 902 may also include a connection to one or more networks 1002 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1002, the system 100 may be distributed across a networked environment, as will be discussed further below with FIG. 10.

The server 112 further includes a symbol recognition module 930 that leverages image context for improved glyph classification and text detection. The symbol recognition module 930 performs the processes discussed in connection with FIGS. 1, 4, 5A, and 5B, and/or works in conjunction with another device in the system 100. For example, a device 110 may include the camera(s) 816 and may capture the image 21, whereas the server 112 includes portions of the symbol recognition module 930 that process the captured image 21.

The symbol recognition module 930 includes an image processing engine 932. Among other things, the image processing engine 932 extracts contextual features (120, 420, 520), identifies the set of candidate character locations (e.g., MSERs, HoGs, etc.) (122, 434, 534), extracts features from local pixel patterns in each of the candidate character locations (436, 536), aggregates the identified positive regions into sequences (460), and binarizes the pixels (462). The image processing engine 932 may also divide the captured image into spatial regions (518). If any other pre-processing of the image is performed prior to classification, that may also be performed by the image processing engine 932.

A classifier engine 934 of the symbol recognition module 930 classifies candidate character locations (124, 450, 550) based in part on the contextual feature concatenated onto the candidate text location feature vectors, on contextual features alone (as the gating function 522), and/or on the candidate text location feature vectors (550'). The classifier engine 934 performs the gating function (522) using a different classifier models (stored in classifier storage 938) than is used for text classification (124, 450, 550, 550'). Among other things, the classifier system 934 may be a Support Vector Machine (SVM) classifier employing a Radial Basis Function (RBF) kernel, a neural network, decision trees, AdaBoost (short for "Adaptive Boosting") combined with decision trees, and random forests. The classifier model or models are stored in classifier storage 938, which may be a section of storage 908. Whether input descriptors are "positively" or "negatively" classified may be based on, among other things, whether a score resulting from a comparison of descriptor data with the established model indicates that similarities and/or differences exceed threshold values.

An optical character recognition (OCR) engine 936 of the symbol recognition module 930 may process the symbol-positive regions to recognize contained text (e.g., alphanumeric text) (126, 464). Any OCR algorithm or algorithms may be used, as known in the art.

How tasks are divided between the device 110 and the server 112 may be determined dynamically by task assignment engine 840 of the symbol recognition module 830. The task assignment engine 840 may determine a speed of the connection via network 1002 to the server 112. Based on criteria such as the speed of the network connection, the computational complexity of the process steps, and the computational capabilities of the controller(s)/processor(s) 804, the task assignment engine 840 may apply load balancing heuristics to dynamically divide processing steps between the other engines of the symbol recognition module 830 of the device 110 and the symbol recognition module 930 of the server 112.

The components of the device 110 as illustrated in FIG. 8 and the server 112 as illustrated in FIG. 9 are exemplary, and may be a stand-alone device or may be included, in whole or in part, as a component of a larger device or system. Also, while the system 100 has been discussed in the context of glyph and text detection, any symbolic features may be identified and recognized using the techniques discussed herein.

The concepts disclosed herein may be applied within a number of different devices and computer systems, including, for example, image-scanning general-purpose computing systems, server-client computing systems, "smart" cellular telephone computing systems, personal digital assistants (PDAs), cameras, image scanners, tablet computers, wearable computing devices (glasses, etc.), other mobile devices, etc.

Figure 10:
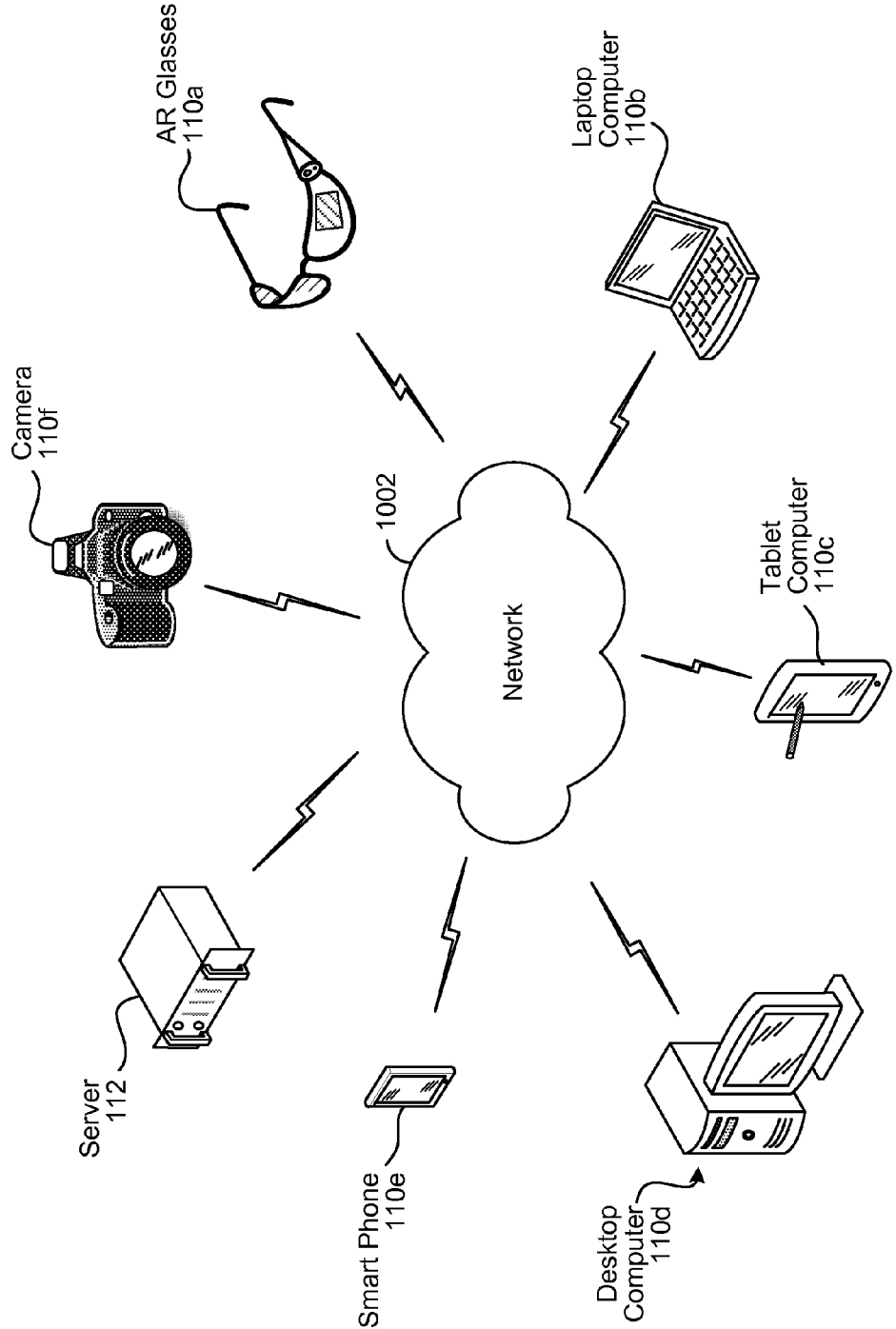
FIG. 10 illustrates an example of a computer network for use with the system to identify text using contextual features.

As illustrated in FIG. 10, multiple devices (110a to 110f) may contain components of the system 100 and the devices may be connected over a network 1002. Network 1002 may include a local or private network or may include a wide network such as the internet. Devices may be connected to the network 1002 through either wired or wireless connections. For example, augmented reality (AR) glasses 110a, a laptop computer 110b, a tablet computer 110c, a smart phone 110e, and a camera 110f may be connected to the network 1002 through a wireless service provider, over a WiFi or cellular network connection or the like. Other devices, such as a desktop computer 110d and a server 112 may connect to the network 1002 through a wired connection. Networked devices may capture images using one-or-more built-in or connected cameras 816 or image capture devices, with processing performed by a symbol recognition module 830 of the same device or another device connected via network 1002 (e.g., on desktop computer 110d or server 112).

The above examples are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, image processing, and classifier systems should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the symbol recognition modules 830 and 930 may be implemented as firmware in hardware. For example, portions of the image processing engine 832 and 932 of the symbol recognition modules 830 and 930 may be implemented as a digital signal processor (DSP) and/or application-specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
    identifying a first region of an image;
    identifying a second region of the image;
    extracting contextual features from the first region of the image, the contextual features comprising at least one of gradient or intensity patterns;

aggregating the contextual features;
quantizing the aggregated extracted features as quantized contextual features of the first region;
determining, using a first classifier, that the quantized contextual features are consistent with image data comprising a glyph;
determining that the first region contains a glyph;
determining that the second region does not contain a glyph;
stopping further processing of the second region;
identifying a candidate glyph corresponding to a maximally stable extremal region (MSER) in the first region of the image;
determining a plurality of glyph feature descriptors based on the candidate glyph, including one or more of determining the candidate glyph's aspect ratio, compactness, solidity, stroke-width to width, stroke-width to height, convexity, raw compactness, or a number of holes included in the candidate glyph;
determining that the candidate glyph comprises a first glyph, using the determined glyph feature descriptors, the quantized contextual features, and a first model; and
performing optical character recognition (OCR) on the first glyph.

2. The method of claim 1, further comprising:
determining that the first region contains a glyph using a second model,
wherein the identifying the candidate glyph, the determining the plurality of glyph feature descriptors, and the determining that the candidate glyph comprises the first glyph is based on the determination that the first region contains a glyph.

3. The method of claim 2, further comprising:
extracting second contextual features from the second region of the image, the second contextual features comprising gradient or intensity patterns;
aggregating the extracted second contextual features;
quantizing the aggregated second contextual extracted features as the contextual features for the second region; and
determining that the second region does not contain a glyph using the second classifier and the quantized second contextual features,
wherein candidate glyphs are not identified for the second region of the image.

4. A computing device comprising:
at least one processor;
a memory including instructions operable to be executed by the at least one processor to perform a set of actions to configure the at least one processor to:
  identify a first region of an image;
  identify a second region of the image;
  extract first contextual features from the first region, the first contextual features relating to a context of the first region;
  process the extracted first contextual features using a first classifier to determine that the extracted first contextual features are consistent with image data comprising a glyph;
  determine that the first region contains a glyph;
  determine that the second region does not contain a glyph; and
  stop further processing of the second region in response to determining the second region does not contain a glyph;
  identify candidate locations of the first region, the candidate locations comprising a first candidate location having a first local pixel pattern;
  extract second contextual features from the first local pixel pattern;
  process, using a second classifier, the first local pixel pattern to determine a first feature descriptor, wherein the first feature descriptor is based on spatial relationships between the first local pixel pattern within the first region;
  process, using the second classifier, the first local pixel pattern to determine a second feature descriptor, wherein the second feature descriptor relates to content of the first candidate location; and
  determine that the first candidate location contains a glyph using the first feature descriptor and the second feature descriptor.

5. The computing device of claim 4, wherein the instructions to determine the first feature descriptor include instructions to:
extract features from the first region comprising gradient or intensity patterns;
aggregate the extracted features; and
quantize the aggregated extracted features as the first feature descriptor.

6. The computing device of claim 4, wherein the instructions to determine the first feature descriptor include instructions for performing one or more of:
scale-invariant feature transform (SIFT),
speeded up robust features (SURF),
color SIFT, or
local binary patterns (LBP).

7. The computing device of claim 4, wherein the instructions to determine that the first candidate location contains the glyph configure the at least one processor to:
use the first feature descriptor, the second feature descriptor, and a first classifier model to determine a score; and
determine that the score exceeds a threshold value.

8. The computing device of claim 7, wherein the instructions to use the first feature descriptor, the second feature descriptor, and the first model to determine the score configure the at least one processor to classify the first candidate location using one or more of:
a Support Vector Machine (SVM) classifier;
an SVM classifier employing a Radial Basis Function (RBF) kernel;
a neural network;
decision trees;
adaptive boosting combined with decision trees; or
random forests.

9. The computing device of claim 4, further comprising instructions to:
select the second region of the image;
determine a third feature descriptor corresponding to the second region, wherein the third feature descriptor is based on spatial relationships between pixels within the second region; and
determine, using the third feature descriptor and the second model, that the second region of the image does not contain a glyph,
wherein identification of candidate locations is not performed for the second region based on the determination that the second region does not contain a glyph.

10. The computing device of claim 4, wherein the instructions to identify the candidate location comprise instructions to compute a maximally stable extremal region (MSER), a histogram of oriented gradients (HoG), or Gabor features.

11. The computing device of claim 4, wherein the first region of the image is the entire image.

12. A non-transitory computer-readable storage medium storing processor-executable instructions to configure a computing device to:
identify a first region of an image;
identify a second region of the image;
extract first contextual features from the first region, the first contextual features relating to a context of the first region;
process the extracted first contextual features using a first classifier to determine that the extracted first contextual features are consistent with image data comprising a glyph;
determine that the first region contains a glyph;
determine that the second region does not contain a glyph;
stop further processing of the second region in response to determining the second region does not contain a glyph;
identify candidate locations of the first region, the candidate locations comprising a first candidate location having a first local pixel pattern;
extract second contextual features from the first local pixel pattern;
process, using a second classifier, the first local pixel pattern to determine a first feature descriptor, wherein the first feature descriptor is based on spatial relationships between the first local pixel pattern within the first region;
process, using the second classifier, the first local pixel pattern to determine a second feature descriptor, wherein the second feature descriptor relates to content of the first candidate location; and
determine that the first candidate location contains a glyph using the first feature descriptor and the second feature descriptor.

13. The non-transitory computer-readable storage medium of claim 12, wherein the instructions to determine the first feature descriptor include instructions to:
extract features from the first region comprising gradient or intensity patterns;
aggregate the extracted features; and
quantize the aggregated extracted features as the first feature descriptor.

14. The non-transitory computer-readable storage medium of claim 12, wherein the instructions to determine the first feature descriptor include instructions for performing one or more of:
scale-invariant feature transform (SIFT),
speeded up robust features (SURF),
color SIFT, or
local binary patterns (LBP).

15. The non-transitory computer-readable storage medium of claim 12, wherein the instructions to determine that the candidate location contains the glyph configure the computing device to:
use the first feature descriptor, the second feature descriptor, and a first model to determine a score; and
determine that the score exceeds a threshold value.

16. The non-transitory computer-readable storage medium of claim 15, wherein the instructions to use the first feature descriptor, the second feature descriptor, and the first model to determine the score configure the computing device to classify the first candidate location using one or more of:
a Support Vector Machine (SVM) classifier;
an SVM classifier employing a Radial Basis Function (RBF) kernel;
a neural network;
decision trees;
adaptive boosting combined with decision trees; or
random forests.

17. The non-transitory computer-readable storage medium of claim 12, further comprising instructions to:
select the second region of the image;
determine a third feature descriptor corresponding to the second region, wherein the third feature descriptor is based on spatial relationships between pixels within the second region; and
determine, using the third feature descriptor and the second model, that the second region of the image does not contain a glyph,
wherein identification of candidate locations is not performed for the second region based on the determination that the second region does not contain a glyph.

18. The non-transitory computer-readable storage medium of claim 12, wherein the instructions to identify the candidate locations comprise instructions to compute a maximally stable extremal region (MSER), a histogram of oriented gradients (HoG), or Gabor features.

19. The non-transitory computer-readable storage medium of claim 12, wherein the first region of the image is the entire image.

* * * * *